United States Patent

Okumura et al.

[11] Patent Number: 5,815,680
[45] Date of Patent: Sep. 29, 1998

[54] SIMD MULTIPROCESSOR WITH AN INTERCONNECTION NETWORK TO ALLOW A DATAPATH ELEMENT TO ACCESS LOCAL MEMORIES

[75] Inventors: Yukihiko Okumura; Toshio Miki, both of Yokohama; Tomoyuki Ohya, Yokosuka; Yoshinori Miki, Yokohama, all of Japan

[73] Assignee: NTT Mobile Communications Network, Inc., Japan

[21] Appl. No.: 356,275

[22] PCT Filed: Sep. 7, 1994

[86] PCT No.: PCT/JP94/01479

§ 371 Date: Oct. 25, 1995

§ 102(e) Date: Oct. 25, 1995

[87] PCT Pub. No.: WO95/09399

PCT Pub. Date: Apr. 6, 1995

[30] Foreign Application Priority Data

Sep. 27, 1993 [JP] Japan .................................. 5-240083
Sep. 27, 1993 [JP] Japan .................................. 5-240084

[51] Int. Cl.$^6$ .................................................. H01J 13/00
[52] U.S. Cl. ..................... 395/311; 395/309; 395/200.43; 395/200.44; 395/800.21; 395/800.22
[58] Field of Search ..................................... 395/311, 312, 395/309, 200.07, 200.2, 446, 454, 476, 477, 484, 800, 379, 382, 200.42–200.45, 200.61, 200.62, 800.11, 800.2, 800.21, 800.22, 800.32

[56] References Cited

U.S. PATENT DOCUMENTS

| | | |
|---|---|---|
| 5,471,592 | 11/1995 | Gove et al. .......................... 395/200.03 |
| 5,533,201 | 7/1996 | Benton et al. .......................... 395/280 |
| 5,537,569 | 7/1996 | Masubuchi .............................. 395/448 |
| 5,559,970 | 9/1996 | Sharma .................................... 395/312 |
| 5,581,767 | 12/1996 | Katsuki et al. .......................... 395/800 |
| 5,613,138 | 3/1997 | Kishi et al. ............................. 395/800 |
| 5,617,538 | 4/1997 | Heller ................................ 395/200.02 |

FOREIGN PATENT DOCUMENTS

| | | |
|---|---|---|
| 5-189585 | 7/1930 | Japan . |
| 60-134957 | 7/1985 | Japan . |
| 63-32649 | 2/1988 | Japan . |
| 3-125252 | 5/1991 | Japan . |
| 4-181362 | 6/1992 | Japan . |

*Primary Examiner*—Ayaz R. Sheikh
*Assistant Examiner*—Raymond N. Phan
*Attorney, Agent, or Firm*—John T. Johnson; Rogers & Wells LLP

[57] ABSTRACT

Datapath elements $1_1$ to $1_N$ can exchange data respectively with local memories $2_1$ to $2_N$ through data buses $6_1$ to $6_N$, so that parallel operations can be performed. The data bus $6_1$, which is connected with one datapath element $1_1$, can be connected with the other data buses $6_2$ to $6_N$ through an interconnection network 5, so that by activating one datapath element $1_1$ only, data exchange can be made with all of the local memories $2_1$ to $2_N$ through the data buses $6_1$ to $6_N$ and the interconnection network 5. Thus, the multiple datapath elements can perform the parallel operations with being related with the multiple local memories: and a simple configuration is employed such that one datapath element can access to any one of the local memories.

10 Claims, 12 Drawing Sheets

FIG. 2

| | |
|---|---|
| ADDRESS 1 | ADDRESS 1 OF LOCAL MEMORY $2_1$ |
| ADDRESS 2 | ADDRESS 1 OF LOCAL MEMORY $2_2$ |
| ≀ | ≀ |
| ADDRESS N | ADDRESS 1 OF LOCAL MEMORY $2_N$ |
| ADDRESS N+1 | ADDRESS 2 OF LOCAL MEMORY $2_1$ |
| ADDRESS N+2 | ADDRESS 2 OF LOCAL MEMORY $2_2$ |
| ≀ | ≀ |
| ADDRESS 2xN | ADDRESS 2 OF LOCAL MEMORY $2_N$ |
| ⋮ | ⋮ |
| ADDRESS (M−1)xN+1 | ADDRESS M OF LOCAL MEMORY $2_1$ |
| ADDRESS (M−1)xN+2 | ADDRESS M OF LOCAL MEMORY $2_2$ |
| ≀ | ≀ |
| ADDRESS MxN | ADDRESS M OF LOCAL MEMORY $2_N$ |

SIMD MULTIPROCESSOR WITH AN INTERCONNECTION NETWORK TO ALLOW A DATAPATH ELEMENT TO ACCESS LOCAL MEMORIES

TECHNICAL FIELD

The present invention relates to a multiprocessor, which is one kind of processors used for the digital signal processing mainly dealing with voice information, image information and the like, and which performs an parallel execution on multiple datapath elements.

BACKGROUND ART

In the field of the signal processing for the voices and images, it is frequently occurred that a simple calculation is repeatedly performed on a plenty of numerical data in order to perform the correlation calculation and the like. In such field of application, by using the multiprocessor according to a certain system (i.e., single-instruction multiple-data-stream (SIMD) system) in which multiple datapath elements, each having the same structure, operate in parallel by the same instruction, it is possible to perform the operational processing at high speed and with high efficiency.

FIG. 11 is a block diagram showing a structural example for a main part of the multiprocessor according to the conventional single-instruction multiple-data-stream system. In this figure, 'N' (where $N \geq 2$) datapath elements $1_1$ to $1_N$ and 'N' local memories $2_1$ to $2_N$ for storing data are connected with a interconnection network 3; hence, data are mutually exchanged between the datapath elements $1_1$–$1_N$ and the local memories $2_1$–$2_N$ as well as among the datapath elements $1_1$–$1_N$; a control element 4 precisely manages states of the datapath elements $1_1$–$1_N$ and the interconnection network 3 so as to instruct them an appropriate procedure of calculation and an appropriate procedure of operations when executing the instruction. Incidentally, each of the local memories $2_1$–$2_N$ has an address space whose size is indicated by 'M', while a necessary address number is given from an address generating unit which is not shown in the figure.

In the configuration of FIG. 11, there are provided multiple local memories $2_1$–$2_N$ the number of which is equal to the number of the datapath elements $1_1$–$1_N$; and, when performing the parallel operation, each of the datapath elements can simultaneously access to each of the local memories; therefore, at this time, the interconnection network 3 interconnects the datapath elements $1_1$–$1_N$ and the local memories $2_1$–$2_N$ respectively in one-by-one connection manner.

In addition, the control regarding the procedure of calculation is concentrated to the control element 4; therefore, it is not necessary to provide an instruction decoder and an arithmetic-control circuit with respect to each of the datapath elements; hence, even when the number of the datapath elements is increased in order to improve the performance of processing, it is possible to reduce the scale of the control circuit against the whole circuitry. Further, by singularizing the instruction steam, it is not necessary to provide multiple control fields, the number of which corresponds to the number of the datapath elements, in the instruction; as a result, it is possible to shorten the instruction word-length; hence, the capacity of the memory for storing the instructions in the programs having a plenty of steps can be remarkably reduced. Incidentally, the interconnection network 3 is a data exchange circuit which constructs a necessary connection pattern with respect to each kind of the calculation; however, in order to realize a more complex calculation in which the result of calculation in another datapath element is referred to, a flexibility in which more varied interconnection patterns are constructed is required for the interconnection network.

In the conventional multiprocessor whose structure is represented by the above-mentioned structure, in order to realize the interconnection between each datapath element and each local memory by a more number of connection patterns, the scale of circuit and the complexity of control for the interconnection network 3 should be increased; particularly when executing a complex calculation which requires a data exchange to be simultaneously made among the multiple datapath elements and local memories, it may be required to provide an interconnection network (i.e., crossbar network) which realizes a plenty of interconnection patterns, the number of which is the factorial of 'N'. Herein, FIG. 12 is a block diagram showing a structural example of the interconnection network 3 described above. In the figure, the interconnection network 3 is normally configured by crossbar switches SWij (where $i=1, 2, \ldots, N$; $j=1, 2, \ldots N$), the number of which is "N×N", as well as crossbar bus-lines L, the number of which is "2N". Each crossbar switch SWij configures a bidirectional-interconnecting switch which comprises two 3-state-output logical elements ("0" output, "1" output and no output), each of which operates based on an interconnection control signal supplied from an external element. When increasing the number 'N' of the datapath elements in order to achieve an improvement in performance of processing, the circuit scale of the interconnection network is correspondingly and remarkably enlarged; hence, there is a problem that an effect for reducing the circuit scale by singularizing the instruction steam will be canceled.

On the other hand, when executing the simple calculation in parallel, it is not necessary to perform the data exchange between the datapath elements and local memories by all of the combinations, but it becomes important to enable the data access at high speed between the datapath element and local memory which are related to each other; therefore, N-by-N network is not necessarily required normally. Thus, it becomes essential to provide a circuit configuration by which both of the simple calculation and complex calculation can be executed with high efficiency without enlarging the circuit scale. However, in the conventional multiprocessor, when increasing the number 'N' of the datapath elements in order to achieve an improvement in performance of processing, the circuit scale of the interconnection network should be correspondingly and remarkably enlarged; hence, there is a problem that the circuit scale should be enlarged.

Next, FIG. 13 is a block diagram showing a configuration in which two datapath elements are provided in the conventional multiprocessor system, according to the single-instruction multiple-data-stream system, having the 'N' datapath elements as described above. In the figure, as similar to FIG. 11 described before, two datapath elements 1a and 1b, each having the same structure, are interconnected with two memories 2a and 2b by the interconnection network 3.

In the multiprocessor whose configuration is represented by the above configuration, in order to perform the calculation processing on single-precision data as well as in order to perform the calculation processing on double-precision data by one datapath element, it is necessary to configure the multiprocessor such that two series of input/output portions are provided for the datapath elements 1a and 1b and each series of input/output portion is interconnected with the two memories 2a and 2b through the interconnection network 3. In this case, the number of interconnection terminals of the interconnection network 3, shown in FIG. 13, for the datapath elements is doubled; hence, this results in doubling the circuit scale of the interconnection network 3; and this will sometimes cause a difficulty in realizing the circuit when the bit-width for the data is increased.

Therefore, as a method of realizing the interconnection network of the multiprocessor having the above configuration by the appropriate circuit scale, a method employing a bus connection can be considered as the most appropriate method: hence, as the concrete circuitry, it is possible to think out the circuitry shown in FIG. 14 in which data buses 5 and 6 are provided; input/output portions 7a and 7b for the datapath elements 1a and 1b are connected to the data bus 5: input/output portions 8a and 8b for the datapath elements 1a and 1b are connected to the data bus 6; therefore, a bulk of double-precision data can be transferred through the data buses 5 and 6. However, two series of input/output portions 7a, 8a and 7b, 8b provide the same manner of connection between the datapath elements 1a, 1b and the data buses 5, 6 respectively; hence, when performing the parallel operation processing, the first datapath element 1a uses the first input/output portion 7a but the second datapath element 1b uses the second input/output portion 8b; therefore, although the two datapath elements 1a and 1b are forced to perform the same calculation, it should be necessary to supply a different instruction and a different control signal, based on the instruction, to each datapath element; thus, there is a problem that the two datapath elements 1a and 1b cannot simultaneously perform the calculation processing using the same instruction.

DISCLOSURE OF INVENTION

The invention as described in claim 1 is made under the consideration of the above-mentioned problems; hence, it is an object of the invention to provide a multiprocessor which accomplishes an improvement in high-speed calculation and flexibility in control flows and which is capable of performing the processing for parallel operations and single operations continuously at more high speed and without executing an unnecessary data-transfer instruction.

Thus, the invention as described in claim 1 is characterized by that in the multiprocessor which comprises multiple datapath elements and multiple local memories, the number of which is equal to or greater than the number of the datapath elements, in which each datapath element executes the same instruction, there are provided a first instruction, by which a first datapath element in the multiple datapath elements is only activated, and a second instruction by which all of the multiple datapath elements are activated, wherein under a state where only the first datapath element is activated, all of the local memories are treated as one memory to which the first datapath element can access.

The claim 1 describes the invention as follows: in order to improve the performance of processing of the multiprocessor, there are provided a state (single operating mode) in which only the first datapath element is activated and another state (parallel operating mode) in which all of the datapath elements are activated; and in the single operating mode, all of the local memories are treated as one memory to which the first datapath element can access.

According to the invention as described in claim 1, a mutual state transition between the single operating mode and parallel operating mode can be smoothly made by a change of mode according to the instruction; hence, the invention can easily respond to the application which requires a high-speed and flexible control flow.

In addition, the invention as described in claim 3 is made under the consideration of the aforementioned problems; hence, it is an object of the invention to provide a multiprocessor which can realize a parallelization for the datapath elements without causing an increase in the circuit scale and in which the double-precision operation and parallel operation can be coexisted.

Thus, the invention as described in claim 3 is characterized by that in the multiprocessor which comprises multiple datapath elements and multiple local memories, the number of which is equal to or greater than the number of the datapath elements, in which each datapath element executes the same instruction, there are provides multiple data buses, by which the multiple datapath elements are interconnected with the multiple local memories respectively in one-by-one connection manner, and an interconnection means by which the multiple data buses are interconnected with each other and one of the multiple datapath elements is interconnected with all of the local memories.

The claim 3 describes the invention as follows: under the state where only one of the multiple datapath elements is activated, the interconnection means enables an interconnection to be established such that only one of the multiple datapath elements is interconnected with all of the local memories; and under the state where all of the datapath elements are activated, the multiple datapath elements are interconnected with the multiple local memories respectively in one-by-one connection manner through the data buses.

According to the invention as described in claim 3, it is possible to simplify the configuration of the interconnection network, between the datapath elements and local memories, for which a large-scale circuit is normally required in the multiprocessor; hence, it is possible to remarkably reduce the overall circuit scale, as compared to the conventional multiprocessor, even when increasing the number of datapath elements.

In addition, the invention as described in claim 4 is made under the consideration of the aforementioned problems; hence, it is an object of the invention to provide a multiprocessor which can realize the parallelization for the datapath elements without causing an increase in the circuit scale and which can perform the parallel operations at more high speed.

Thus, the invention as described in claim 4 is characterized by that in the multiprocessor which comprises multiple datapath elements and multiple local memories, the number of which is equal to or greater than the number of the multiple datapath elements, in which each datapath element executes the same instruction; input/output portions for the multiple datapath elements and the multiple local memories are doubled; and there are provided a data bus, by which all of the datapath elements are interconnected with the local memories through their first input/output portions, and a data path, by which second input/output portions of the multiple datapath elements are directly interconnected with second input/output portions of the corresponding local memories, and which performs a data exchange between one of the multiple datapath elements and another datapath element or between one of the multiple datapath elements and all of the local memories.

The claim 4 describes the invention as follows: in the case where the multiple datapath elements are activated in parallel, the operation is executed through the data path by which the datapath element and local memory are directly interconnected together; but under the state where only one of the multiple datapath elements is activated, the data exchange is performed between another datapath element and local memory through the data bus.

According to the invention as described in claim 4, it is possible to simplify the configuration of the interconnection network, between the datapath elements and local memories, for which the large-scale circuit is normally required in the multiprocessor; hence, it is possible to remarkably reduce the overall circuit scale, as compared to the conventional multiprocessor, even when increasing the number of datapath elements. Further, in the parallel operating mode, it is possible to execute the parallel operations at more high speed; in the single operating mode, it is possible to perform the data exchange between one datapath element and another datapath element or between one datapath element and all of the local memories.

In addition, the invention as described in claim 7 is made under the consideration of the aforementioned problems; hence, it is an object of the invention to provide a multiprocessor which can realize the parallelization for the datapath elements without causing an increase in the circuit scale; and which can improve the high-speed performance of the operations as well as the flexibility in the control flows; further which can perform the processing for the parallel operations and double-precision operations continuously at high speed without executing unnecessary data-transfer instruction.

Thus, the invention as described in claim 7 is characterized by that in the multiprocessor which comprises first and second datapath elements, each at least having first and second input/output portions, and memories, the number of which is equal to or greater than the number of the datapath elements so that the first and second datapath elements can simultaneously operate in parallel; there are provided a first data bus, which is connected with the first input/output portion of the first datapath element and the second input/output portion of the second datapath element and is also connected to at least one of the memories, and a second data bus, which is connected with the second input/output portion of the first datapath element and the first input/output portion of the second datapath element and is also connected to the remaining of the memories; hence, the first and second datapath element can exchange the data mutually with any one of the memories through the first and second data buses.

The claim 7 describes the invention as follows; in order to meet the aforementioned requirements and to realize both of the parallel-operation processing and double-precision-operation processing, the first and second datapath elements exchange the data mutually with first and second memories through the first data bus, which is connected with the first input/output portion of the first datapath element, the second input/output portion of the second datapath element and the first memory, and the second data bus which is connected with the second input/output portion of the first datapath element, the first input/output portion of the second datapath element and the second memory.

According to the invention as described in claim 7, it is possible to construct the interconnection network by which not only the single-precision data but also the double-precision data can be exchanged between one datapath element and one memory or between two datapath elements; as a result, the realization for both of the parallel-operation processing and double-precision processing can improve the performance in processing of the multiprocessor with smaller-scale circuits. Further, in the single-precision operation, two independent data can be transferred by means of two data buses.

In addition, the invention as described in claim 9 is made under the consideration of the aforementioned problems; hence, it is an object of the invention to provide a multiprocessor which can improve the high-speed performance for the operations as well as the flexibility in the control flows and which can perform the processing for the parallel operations and operations continuously at more high speed.

Thus, the invention as described in claim 9 is characterized by that in the multiprocessor which comprises multiple datapath elements and local memories, the number of which is equal to or greater than the number of the datapath elements and in which each datapath element can execute the same instruction; there is provided a control means which as the instruction for controlling the operations of the multiple datapath elements, supplies a first conditionally executed instruction to the multiple datapath elements in order to control the current execution of the operations on the basis of flag statuses representing states of previous results of the operations, respectively held by the multiple datapath elements, and which produces a second conditionally executed instruction for controlling the current execution of the operations on the basis of a combination of the flag statuses respectively held by the multiple datapath elements so as to supply the second conditionally executed instruction to the multiple datapath elements.

The claim 9 describes the invention as follows: as the instruction to control the operations of the multiple datapath elements, the control means for controlling the operations of the multiple datapath elements outputs the first conditionally executed instruction for controlling the current execution of the operations on the basis of the flag statuses representing the previous results of the operations, respectively held by the multiple datapath elements; and the control means also produces the second conditionally executed instruction for controlling the current execution of the operations on the basis of the combination of the flag statuses respectively held by the multiple datapath elements so as to output the second conditionally executed instruction.

According to the invention as described in claim 9, it is possible to reduce the number of the operational steps of the program; and it is possible to improve the performance in processing of the processor per unit time.

BRIEF DESCRIPTION OF DRAWINGS

FIG. 2 is a systematic drawing showing the contents of the address space of the datapath element in the multiprocessor according to this invention.

BEST MODE FOR CARRYING OUT THE INVENTION

Hereinafter, the working examples of this invention will be described in detail with reference to the drawings.

A. First Working Example

Figure 1:
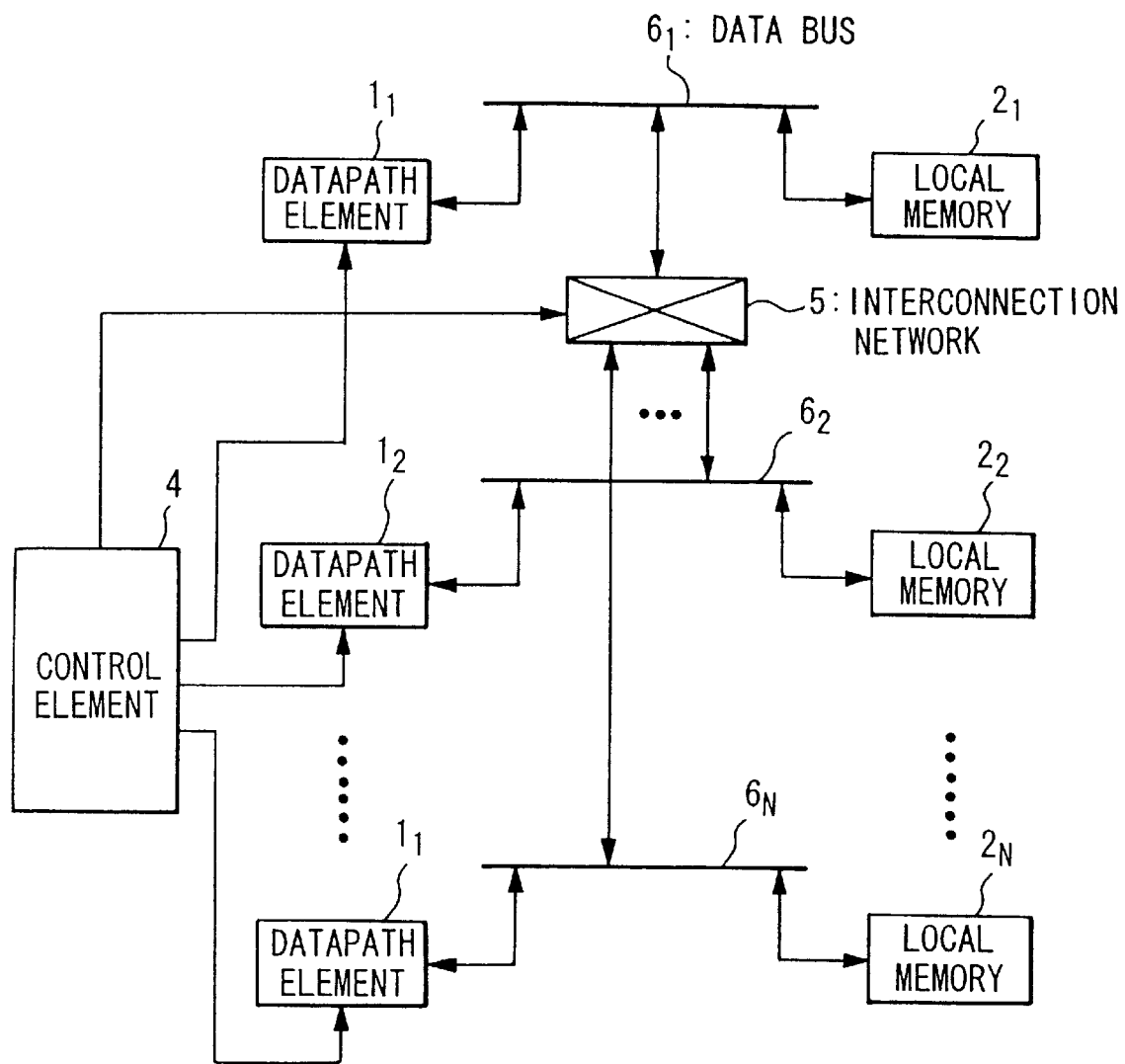
FIG. 1 is a block diagram showing a configuration of a multiprocessor according to a first working example of this invention.
Figure 11:
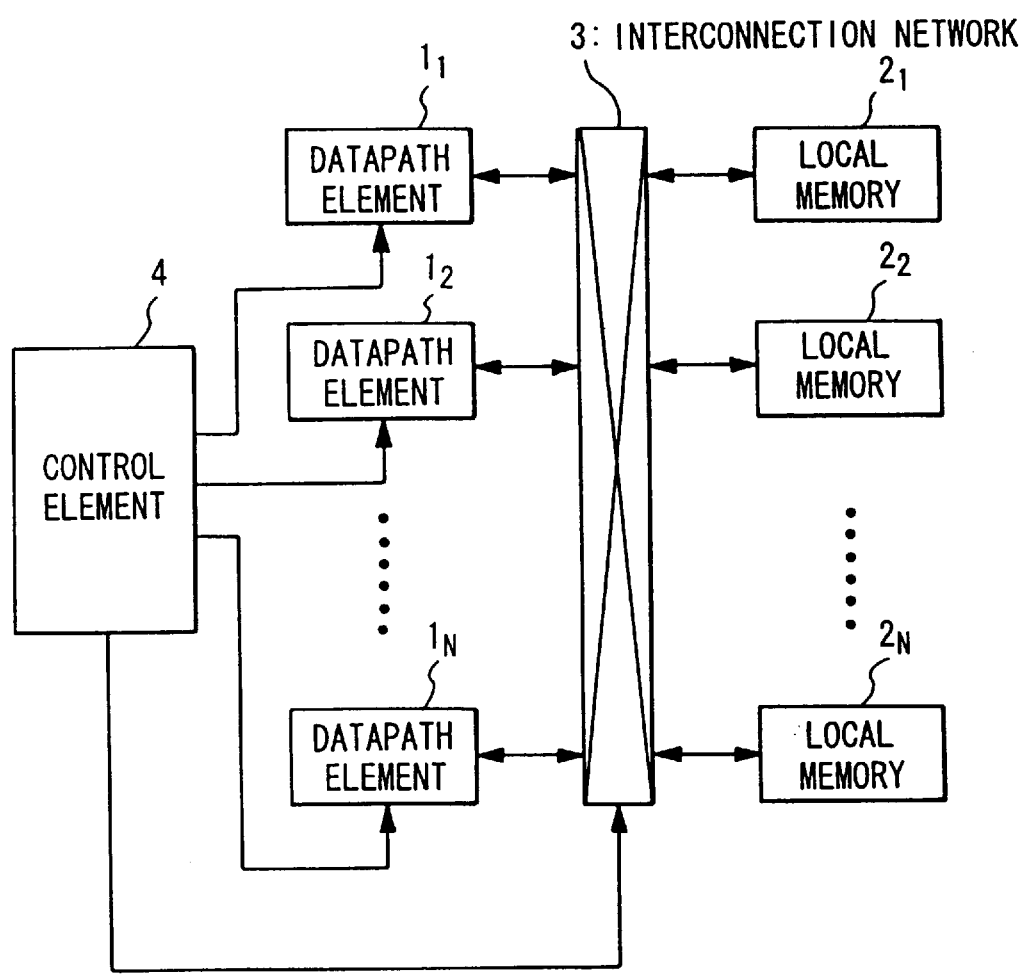
FIG. 11 is a block diagram showing an example of configuration for a main part of the conventional multiprocessor according to the single-instruction multiple-data-stream system.
Figure 12:
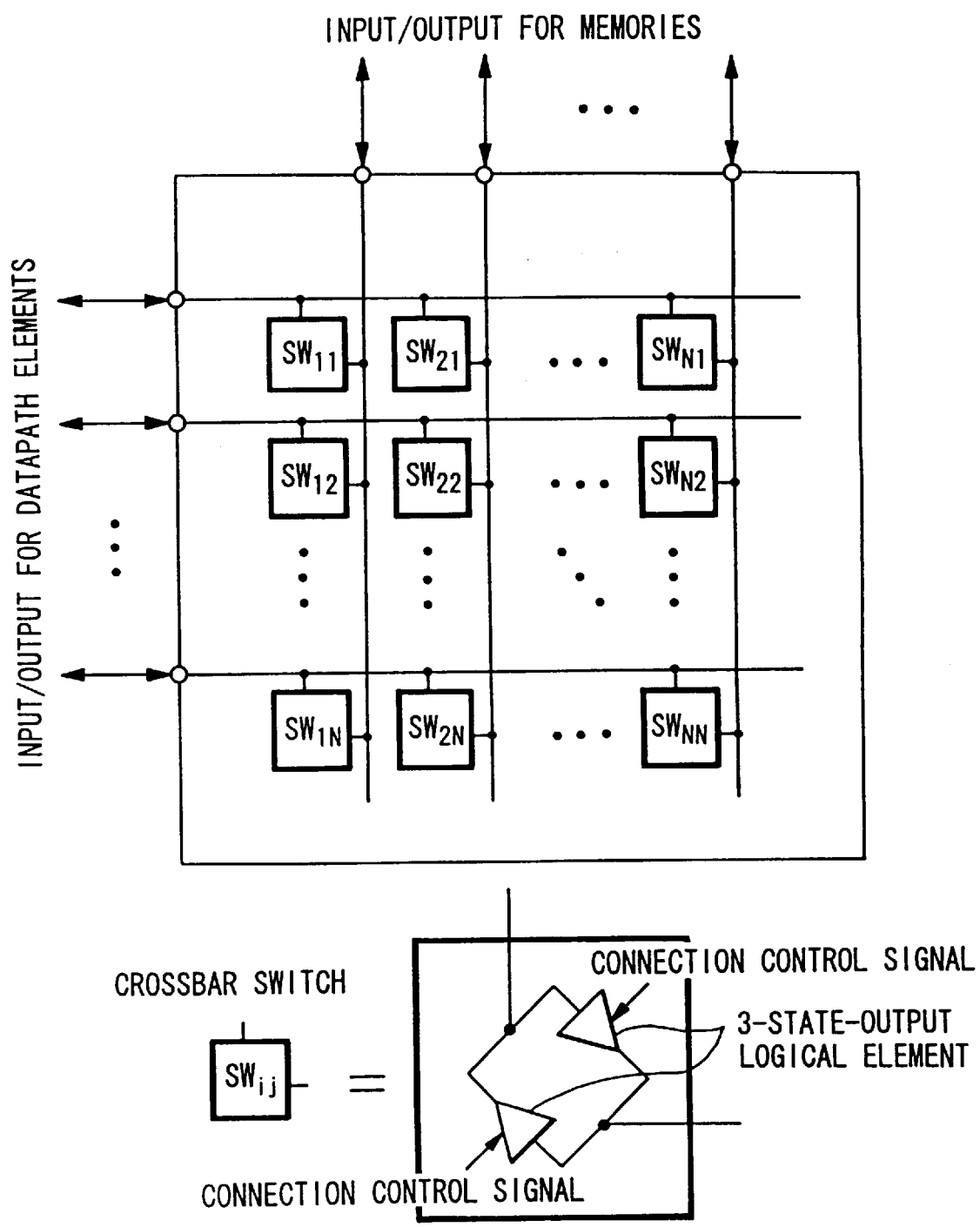
FIG. 12 is a block diagram showing the configuration of the interconnection network used by the conventional multiprocessor.
Figure 13:
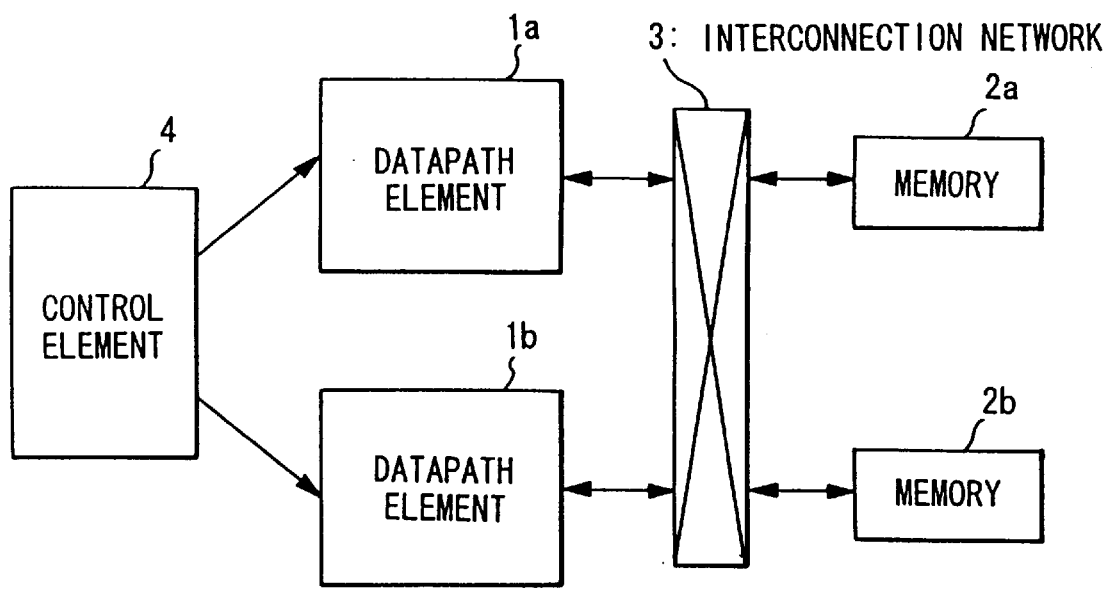
FIG. 13 is a block diagram showing the configuration of the conventional 2-by-2 multiprocessor according to the single-instruction multiple-data-stream system.

FIG. 1 is a block diagram showing the configuration of the multiprocessor according to a first embodiment of the present invention, wherein the parts corresponding to those shown in FIG. 11 will be designated by the same numerals; hence, the description thereof will be omitted. In the figure according to the first embodiment, there are provided 'N' data buses $6_1$ to $6_N$, each of which corresponds to each pair of the datapath elements $1_1$ to $1_N$ and the local memories $2_1$ to $2_N$ and each of which connects each pair of them; further, there are provided the interconnection network 5 which interconnects the data bus $6_1$, coupled with one datapath element $1_1$, and other data buses $6_2$ to $6_N$ together. Therefore, the provision of the interconnection network 5 and the data bus $6_1$ enables the datapath element $1_1$ to be connected with the local memories $2_1$ to $2_N$ in one-by-N connection manner.

When executing each operational instruction, in the single operating mode, only the datapath element-$1_1$ performs a data exchange with any one of the local memories $2_1$ to $2_N$ by using the interconnection network 5 and the data bus $6_1$; in the parallel operating mode, the 'N' datapath elements $1_1$ to $1_N$ respectively perform the data exchange with the local memories $2_1$ to $2_N$ by using the corresponding data buses $6_1$ to $6_N$ respectively.

Next, the address space for each of the datapath elements $1_1$ to $1_N$ in the configuration described above will be described with reference to FIG. 2. First, in the parallel operating mode in which all of the datapath elements $1_1$ to $1_N$ are activated, the datapath elements $1_1$ to $1_N$ are connected with the corresponding local memories $2_1$ to $2_N$ respectively in one-by-one connection manner by using the foregoing data buses $6_1$ to $6_N$; hence, even if the instruction is singularized, each of the datapath elements $1_1$ to $1_N$ provides an address space (having a size 'M') by which it can simultaneously access to the local memories $2_1$ to $2_N$. On the other hand, the address space of the datapath element $1_1$, which is only activated in the single operating mode, is different from the address space in the parallel operating mode; for example, the contents thereof is shown in FIG. 2, wherein an interleave arrangement is employed so that the same addresses of the local memories $2_1$ to $2_N$ are disposed in turn in one block; and the blocks are arranged continuously from address 1 to address M which correspond to the address space of one local memory; hence, the datapath element $1_1$, can access to the address space (having a size of "N×M") for all of the local memories $2_1$ to $2_N$. By a mode-switching instruction, it is possible to switch over the mode between the two operating modes during the execution of the program; and the control element 4 manages and controls the connection pattern of the interconnection network 5 and the state of the data buses which correspond to each of the modes.

In the configuration described above, there is further provided a transfer instruction between the datapath elements; hence, by that instruction, the results of the operations can be exchanged mutually between the datapath element $1_1$, which is activated in the single operating mode, and the other datapath elements $1_2$ to $1_N$. By co-using the transfer instruction between the datapath elements and the operation-mode-switching instruction, it is possible to smoothly use the results of the parallel operations in the consecutive operational processing without executing unnecessary memory transfer instructions.

By the above-mentioned configuration and the special instructions, it is possible to perform a high-speed execution on the operations which are specifically used in the digital signal processing such as the correlation calculation, convolution calculation and the like.

B. Second Working Example

Figure 3:
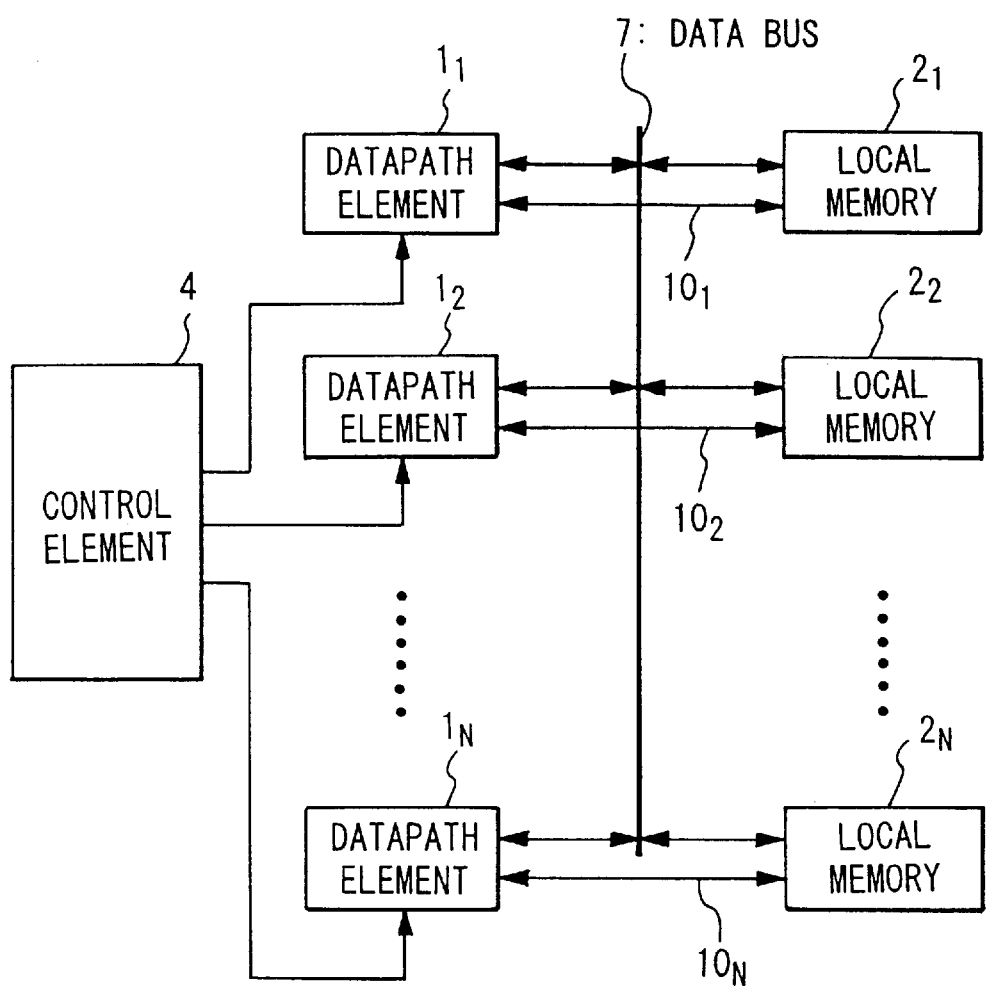
FIG. 3 is a block diagram showing a configuration of a multiprocessor according to a second working example of this invention.

Consecutively, the second embodiment of this invention will be described with reference to FIG. 3. In FIG. 3, the input/output portion for each of the datapath elements $1_1$ to $1_N$ and the input/output portion for each of the local memories $2_1$ to $2_N$ are doubled respectively; and there is provided a data bus 7 by which all of the datapath elements $1_1$ to $1_N$ and the local memories $2_1$ to $2_N$ are connected together by their first input/output portions, while there are also provided data paths $10_1$ to $10_N$ by which the second input/output portions of the datapath elements $1_1$ to $1_N$ are directly and respectively connected with the second input/output portions of the corresponding local memories $2_1$ to $2_N$. According to this configuration, in the parallel operating mode, it is possible to perform a further high-speed execution on the parallel operations by using the data paths $10_1$ to $10_N$, respectively, which directly connect the datapath elements $1_1$ to $1_N$ and the local memories $2_1$ to $2_N$ together; whereas in the single operating mode, it is possible to perform a data exchange between one datapath element, e.g., $1_1$, and the other datapath elements $1_2$ to $1_N$ or between the datapath element $1_1$ and the local memories $2_1$ to $2_N$ through the data buses.

C. Extended Example of the Second Working Example

In the above-mentioned configuration, as the extended example of the second working example, it is possible to further provide an interface path between the data bus 7 and an external device so that while executing the operation in the single operating mode, the data exchange can be simultaneously executed between the external device and local memory.

Figure 4:
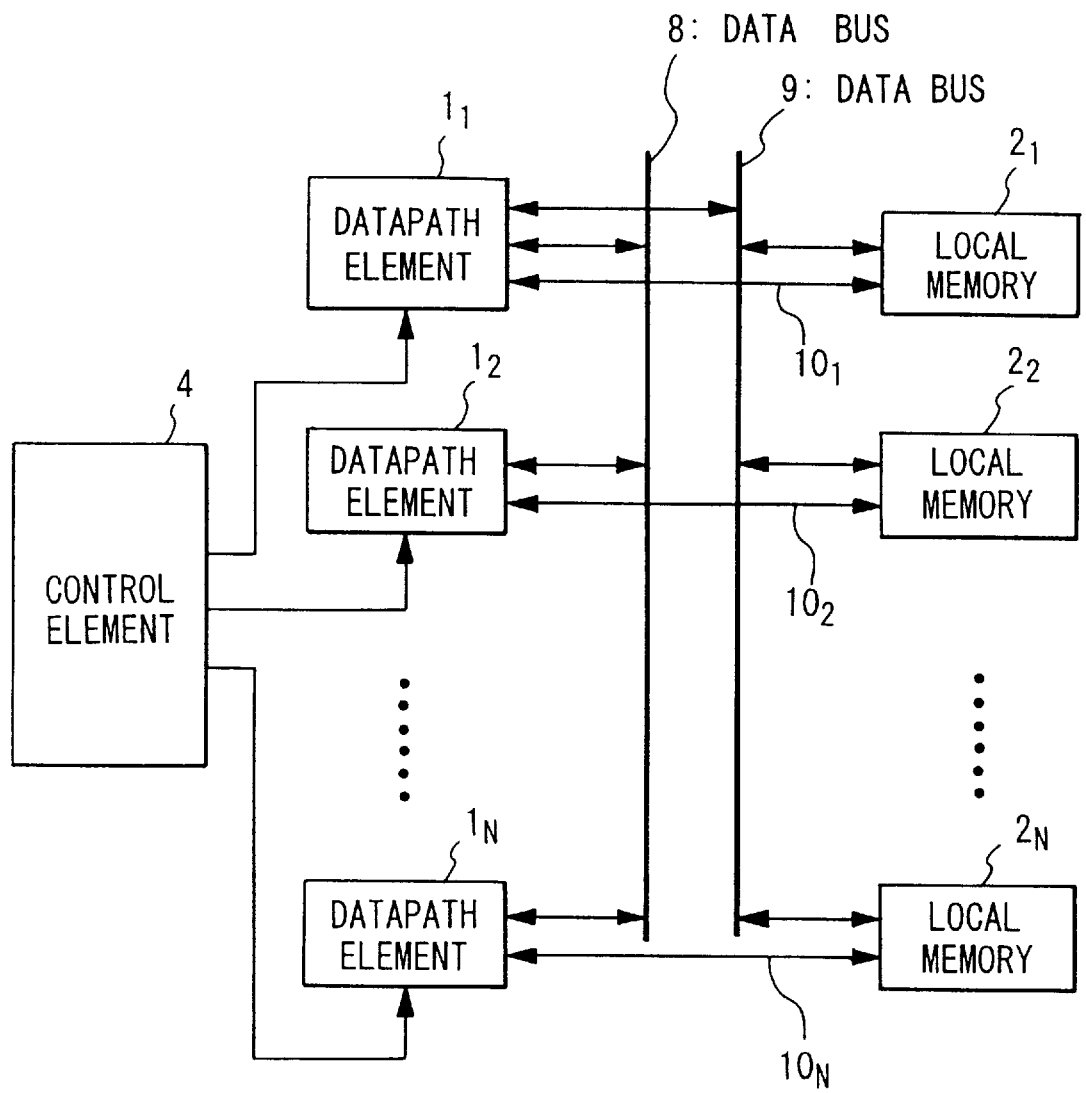
FIG. 4 is a block diagram showing a configuration of a multiprocessor according to an extended example of the second working example of this invention.

As shown in FIG. 4, it is possible to replace the data bus 7 in FIG. 3 with two independent data buses 8 and 9, wherein the data bus 8 establishes a connection among the datapath elements $1_1$ to $1_N$, while the data bus 9 establishes a connection between the datapath element $1_1$ and the local memories $2_1$ to $2_N$. By employing such configuration, it is possible to perform a data transfer between the data path element $1_1$ and another datapath element and a data transfer between the datapath element $1_1$ and the local memories $2_1$ to $2_N$ in parallel; hence, it is possible to execute the complex calculation, accompanied with the data transfer, at further high speed.

D. Third Working Example

Figure 5:
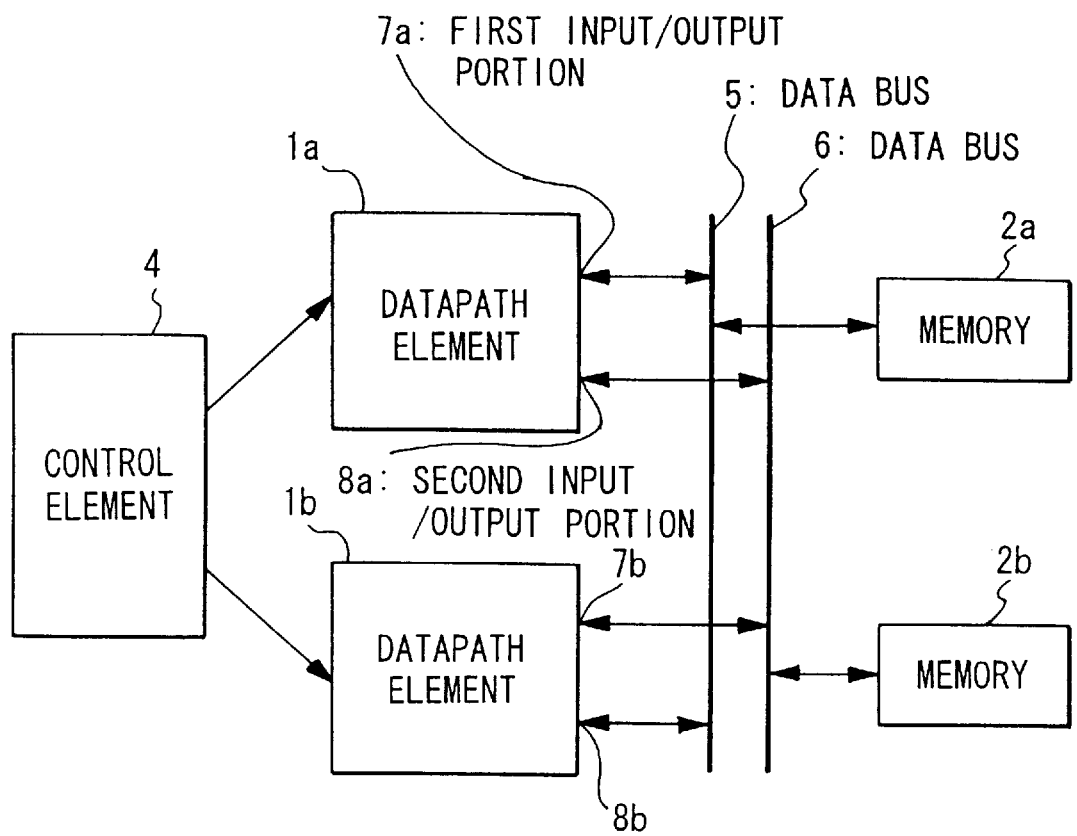
FIG. 5 is a block diagram showing a configuration of a 2-by-2 multiprocessor according to a third working example of this invention.
Figure 14:
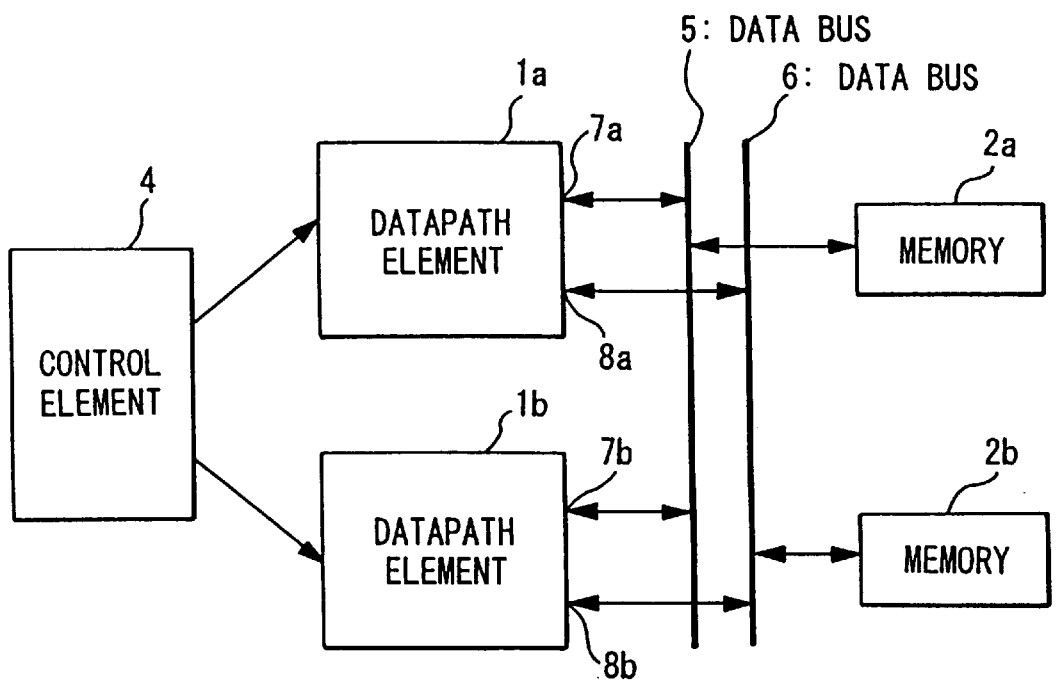
FIG. 14 is a block diagram showing an example of the multiprocessor proposed.

Next, the description will be given with respect to the case where two datapath elements are provided in the conventional multiprocessor according to the single-instruction multiple-data-stream system providing the 'N' datapath elements as described before. FIG. 5 is a block diagram showing the configuration of the multiprocessor, according to the third working example of this invention, which comprises the two datapath elements, wherein the parts corresponding to those shown in FIG. 14 will be designated by the same numerals; hence, the description thereof will be omitted. In the figure, the first input/output portion 7a of the first datapath element 1a and the second input/output portion 8b of the second datapath element 1b are connected with the data bus 5; the second input/output portion 8a of the first datapath element 1a and the first input/output portion 7b of the second datapath element 1b are connected with the data bus 6; further, the data buses 5 and 6 are respectively connected with the memories 2a and 2b.

Two series of input/output portions for each of the datapath element 1a and 1b are provided to simultaneously transfer a high-order-half part and a low-order-half part in the double-precision data when performing the double-precision operations; accordingly, the datapath element 1a and 1b normally contain registers which are capable of retaining a bulk of double-precision data.

On the other hand, according to the above configuration, it is possible to exchange the results of the operations mutually between the two datapath elements 1a and 1b by the instruction. In this case, when exchanging the double-precision data, the high-order-half part and low-order-half part should be replaced with each other if the above configuration is not modified; therefore, a circuit which replaces the high-order-half part and low-order-half part with each other is equipped in the datapath element 1b; hence, when executing the transfer instruction between the datapath elements, the data are forced to pass through such replacing circuit so that the double-precision data transferred are disposed in a right order. Incidentally, when performing the double-precision calculation in the datapath element 1b, the replacing circuit is used according to needs; hence, the high-order-half part and low-order-half part can be disposed rightly.

According to the configuration described above, it is possible to adopt the multiprocessor according to the single-instruction multiple-data-stream system for the application, such as the operational processing which is employed specifically for the digital signal processing such as the correlation integration, convolution integration and the like, which should meet the requirements in both of the speed and precision.

E. Fourth Working Example

Figure 6:
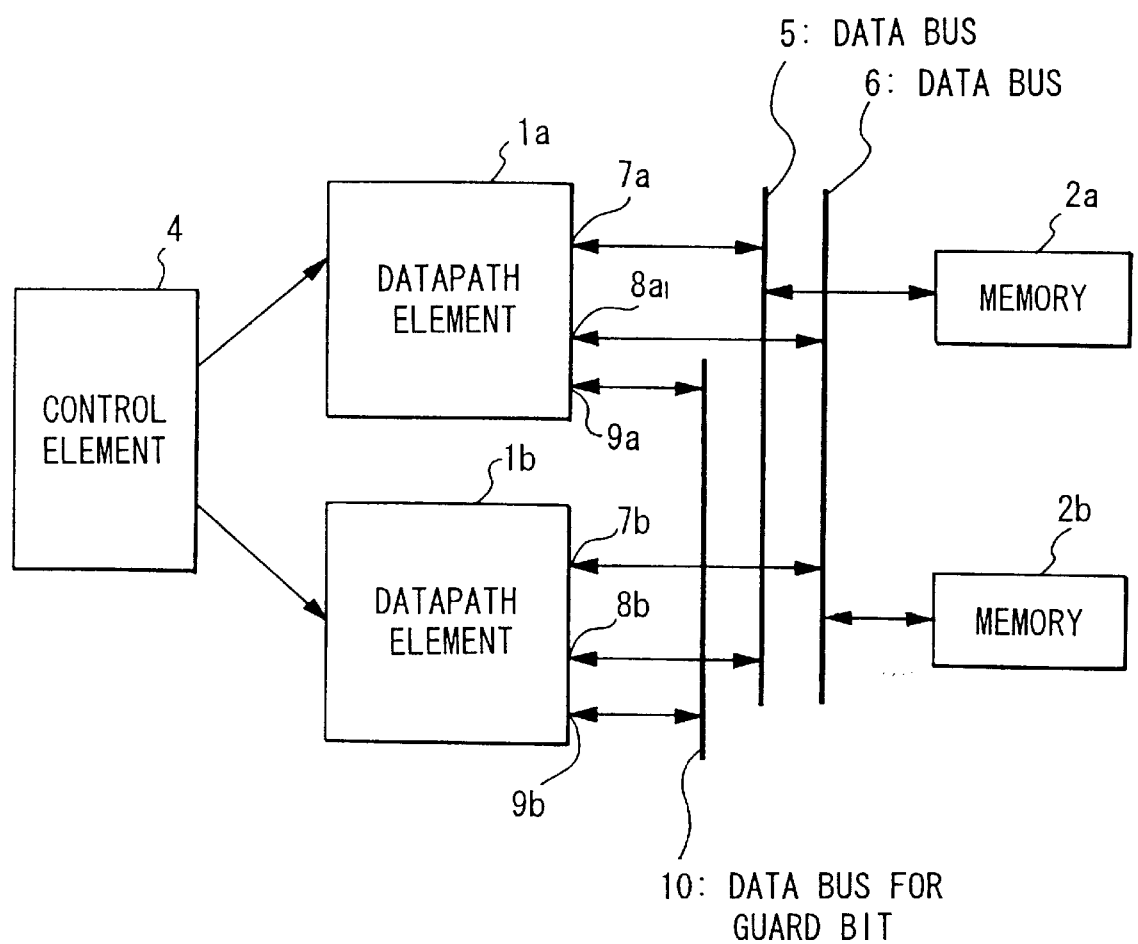
FIG. 6 is a block diagram showing a configuration of a multiprocessor according to a fourth working example of this invention.

Consecutively, the fourth working example of this invention will be described. FIG. 6, related with FIG. 5, is a block diagram showing the configuration of the multiprocessor which can simultaneously exchange the guard-bit data as well. In the figure, guard-bit input/output portions 9a and 9b of the datapath elements 1a and 1b are connected with a third data bus 10; hence, when exchanging the data mutually between the datapath elements 1a and 1b, it is possible to simultaneously exchange the guard-bit data as well through the third data bus 10. Thus, as for the application which requires a further high precision, it is possible to adopt the multiprocessor according to this invention while maintaining the performance in the processing speed in the parallel operating mode. Incidentally, the guard bit described herein indicates a bit string which is an extended part in high order of the double-precision data; and it is normally extended in order to realize the high precision when performing accumulating operations in the accumulator for storing the results of calculation in the datapath element. Incidentally, in the above example, the number of the memories can be set at three or more; in addition, three or more input/output portions can be provided for each datapath element.

F. Fifth Working Example

Figure 7:
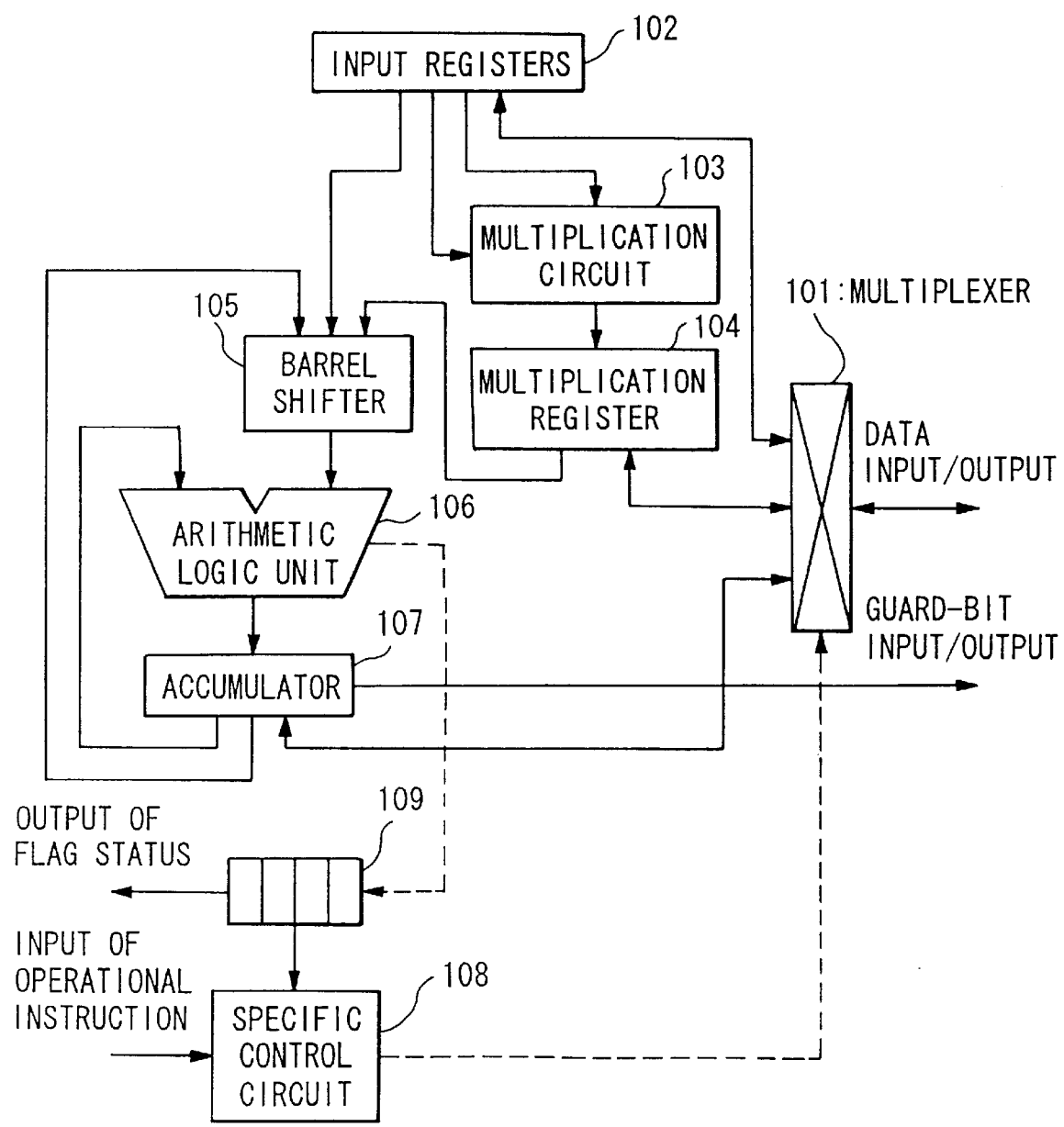
FIG. 7 is a block diagram showing a configuration of the datapath element of this invention.

Next, as the fifth working example, the operations of the datapath element, provided in the aforementioned working example, will be described with reference to FIG. 7. FIG. 7 is a block diagram showing the configuration of the datapath element 1a or 1b. In the figure, a multiplexer 101 performs input/output operations for the data in N-by-one manner between a data bus 6i and a datapath element 1i. Input registers 102 are configured by multiple registers, wherein numerical data, which are transmitted thereto through the multiplexer 101, are stored. A multiplication circuit 103 performs multiplication based on the data retained by the input registers 102; hence, a result of the multiplication is supplied to a multiplication register 104. The multiplication register 104 retains the above-mentioned result of multiplication, which is supplied to a barrel shifter 105 at a certain timing. Next, the barrel shifter 105 performs shift operations on the data, retained by the input registers 102, and the data, retained by the multiplication register 104 as well as data retained by an accumulator 107 which will be described later; and then, results of the operations are supplied to an arithmetic logic unit 106. The arithmetic logic unit 106 performs arithmetic logic operations on the result of the operation performed by the barrel shifter 105 and the results of the operations retained by the accumulator 107; hence, the result is supplied to the accumulator 107. The accumulator 107 retains the result of the operation performed by the arithmetic logic unit 106 so as to supply it to the arithmetic logic unit 106 or the barrel shifter 105 at a certain timing. The operations performed by the multiplication circuit 103, the barrel shifter 105 and the arithmetic logic unit 106 described above can be performed in parallel.

Next, a specific control circuit 108 is designed to control the operation of each of the circuits described above on the basis of the operational instruction given from the control element 4. In this case, on the basis of a flag status 109, it is possible to perform a conditional execution, by which the execution/non-execution for the operational instruction is controlled, which will be described later. In addition, the final result of operation, which is retained by the multiplication register 104 or the accumulator 107, is transferred to the external device through the multiplexer 101. Incidentally, the contents of the accumulator 107 is determined such that the transfer of the data, containing the guard bit, can be performed. In addition, the above-mentioned configuration is equally applied to both of the datapath elements 1a and 1b; hereinafter, suffixes 'a' and 'b' are used.

Next, the aforementioned conditional execution will be described. The conditionally executed instruction (conditional operation instruction) is the instruction by which based on the flag status 109, which is obtained by the previous operation, the condition decision (i.e., decision for the coincidence/non-coincidence between the designated condition and flag status) is performed so that the result of the decision is used to control the execution/non-execution of the current operational instruction. Conventionally, in order to perform the similar processing, it is necessary to execute a normal operation instruction in addition to the conditional branch instruction (i.e., instruction to control the branching/non-branching by the result of the condition decision). However, in the conditionally executed instruction, it is not necessary to execute the conditional branch instruction; hence, it is very effective in reducing the number of operational steps in the program. The reduction in the number of operational steps for the same program is equivalent to the improvement in the performance of processing of the processor per unit time.

In the case where the operation control is realized by the conditionally executed instruction in the multiprocessor, if the datapath elements 1a and 1b are different from each other in terms of the contents of the operations, it is necessary to perform the execution control based on the condition decision by each of the datapath elements. Thus, by providing specific control means, by which the flag status can be directly referred to, for each of the datapath elements, it is possible to execute the conditionally executed instruction (i.e., specific flag processing) in the control element 4 without complicating the control procedure. In contrast, in the operation overflow processing or the like, it is necessary to perform the execution for all of the datapath elements in common; hence, only the specific flag processing described above does not meet such requirement. In such case, it is necessary to perform a common condition decision based on the combination of the flag statuses respectively obtained by the datapath elements (i.e., common flag processing). As described above, by providing the control function which combines both of the conditional execution by the common flag processing and the conditional execution by the specific flag processing, the present invention can perform a flexible program control. Further, by additionally using the instruction to switch the mode between the single operating mode and parallel operating mode described before, it is possible to respond to the program, in which the formal processing part and the complex flow processing part coexist, further easily.

Figure 8:
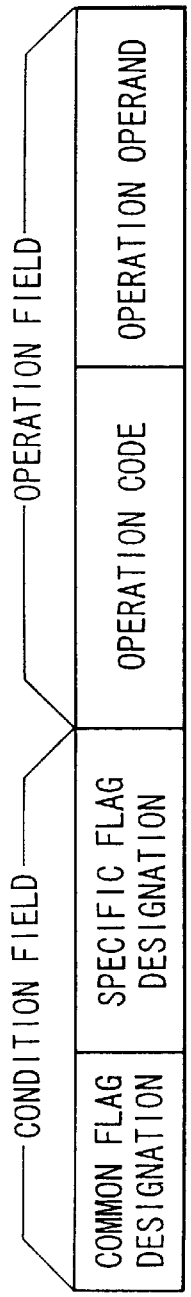
FIG. 8 is a systematic drawing showing a format for the conditionally executed (conditional-operation) instruction.

FIG. 8 is a systematical drawing showing a format of the conditionally executed instruction (conditional operation instruction) described above. In the figure, the conditionally executed instruction consists of a condition field and an operation field. The condition field consists of a common flag field, which is used to designate the flag status used for the condition decision in the common flag processing, and a specific flag field which is used to designate the flag status used for the condition decision in the specific flag processing. In addition, the operation field consists of an operation code, which designates the kind of operation, and an operation operand which designates the register used for the operation.

Figure 9:
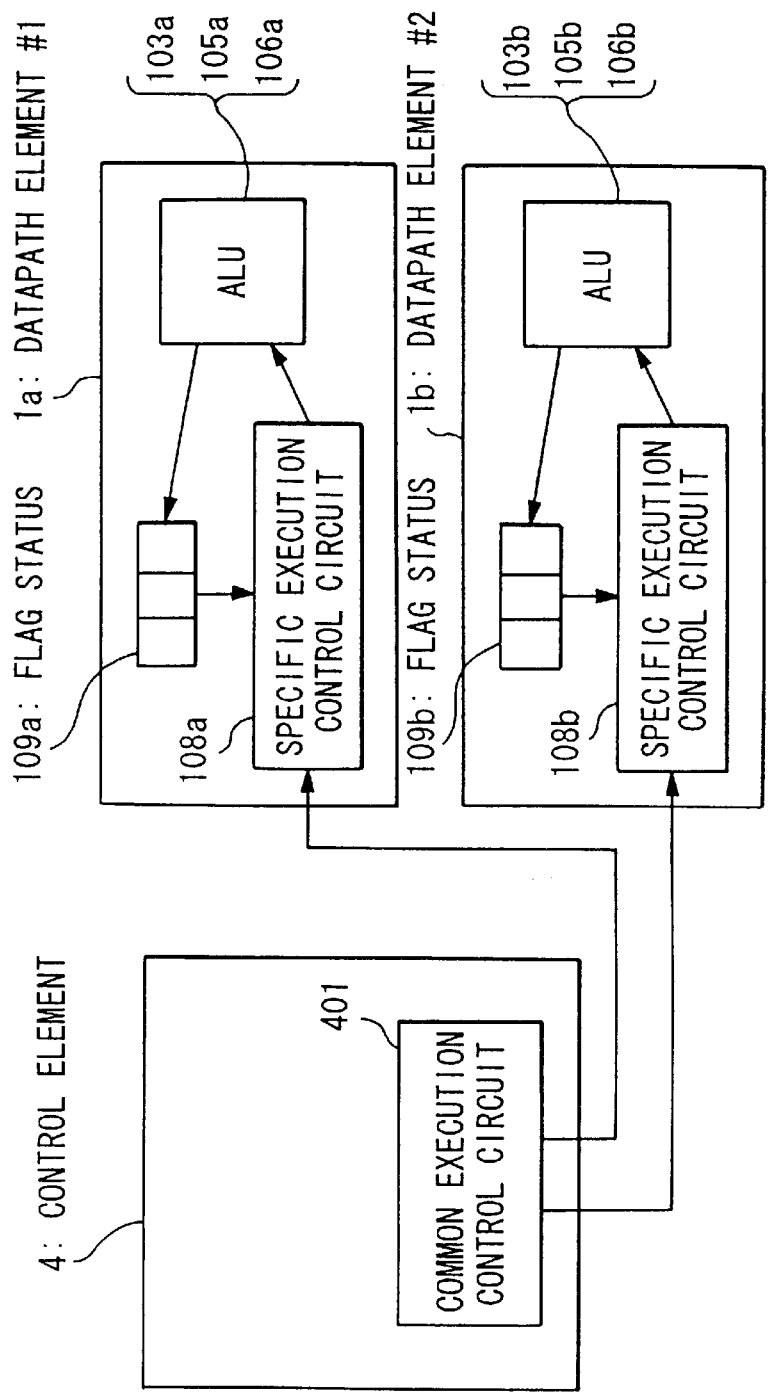
FIG. 9 is a systematic drawing for explaining operations of specific flag processing.

Next, the aforementioned specific flag processing will be described. FIG. 9 is a systematical drawing which is used to explain the operations of the specific flag processing, wherein the parts corresponding to those shown in FIG. 5 or FIG. 7 are designated by the same numerals. In the figure, a common execution control circuit 401 outputs a common conditionally executed instruction to both of the datapath elements 1a and 1b. Each of the datapath elements 1a and 1b performs the condition decision by a specific execution control circuit 108 on the basis of each of the flag statuses; thus, the execution/non-execution for the multiplication circuit 103, the barrel shifter 105 or the arithmetic logic unit 106 is controlled in accordance with the result of the condition decision. In this specific flag processing, the zero flag, sign flag and carry flag are used as the flag statuses, for example. Therefore, in the case of the specific flag processing, if the contents of the flag statuses are different from each other with respect to the datapath elements 1a and 1b, the different operations are respectively executed.

Figure 10:
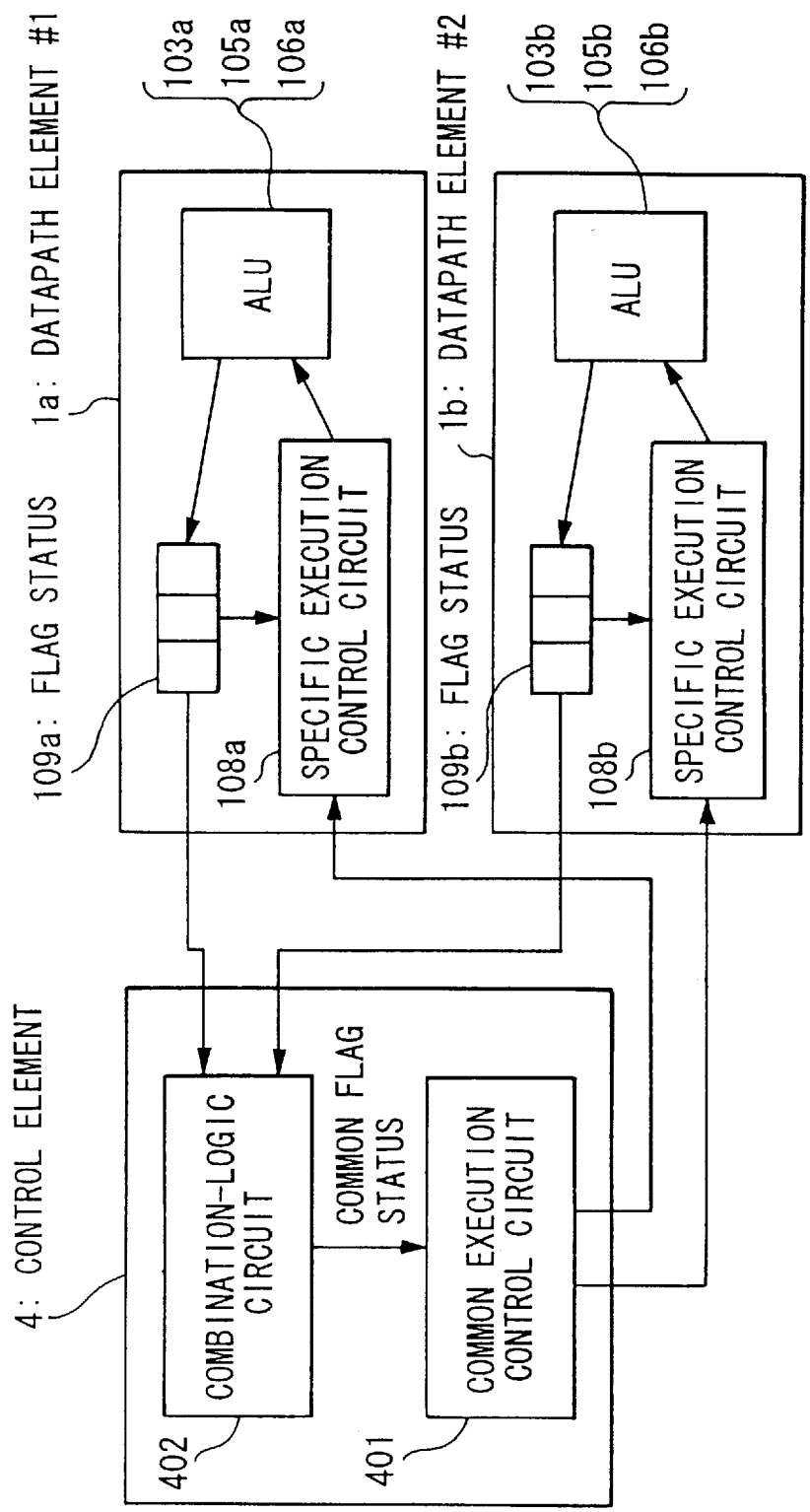
FIG. 10 is a systematic drawing for explaining operations of common flag processing.

Next, the above-mentioned common flag processing will be described. FIG. 10 is a systematic drawing for explaining the operations of the common flag processing. In the figure, the flag status 109, which is retained by each of the datapath elements 1a and 1b, is collected by the control element 104; thereafter, the flag status is subjected to logical-operation processing by a combination-logic circuit 402, which is equipped in the control element 4, and then, it is supplied to the common execution control circuit 401 as the common flag status. The common execution control circuit 401 outputs the common conditionally executed instruction, based on the common flag status described above, to both of the datapath elements 1a and 1b. In each of the datapath elements 1a and 1b, the execution/non-execution for the multiplication circuit 103, the barrel shifter 105 or the arithmetic logic unit 106 is controlled in accordance with the above-mentioned conditionally executed instruction. In this case, the specific control circuit 108, provided in each of the datapath elements 1a and 1b, does not perform the condition decision based on the flag status 109. In this common flag processing, the overflow flag is used as the flag status, for example.

We claim:

1. In a multiprocessor in a single-instruction multiple-data-system (SIMD) system in which a multiple number of datapath elements, each having the same structure, operate in parallel by the same instruction, and which comprises the multiple number of datapath elements and a multiple number of local memories, wherein the number of local memories is equal to or greater than the number of the datapath elements and in which each datapath element executes a same instruction, the multiprocessor characterized by providing:

a first instruction, by which only a first datapath element among the multiple datapath elements is activated, and a second instruction by which all of the multiple datapath elements are activated, wherein in a state where only the first datapath element is activated, all of the local memories are treated as one memory to which the first datapath element can access.

2. A multiprocessor as described in claim 1, characterized by further providing a third instruction by which data are exchanged between the first datapath element and another datapath element.

3. In a multiprocessor which comprises a multiple number of datapath elements and a multiple number of local memories, wherein the number of local memories is equal to or greater than the number of the datapath elements and in which each datapath element executes a same instruction, the multiprocessor characterized by comprising:

multiple data buses by which the multiple datapath elements are connected with the local memories respectively in one-by-one manner; and interconnection means which mutually-interconnects the multiple data buses so that one of the multiple datapath elements is connected with all of the local memories.

4. In a multiprocessor which comprises a multiple number of datapath elements and a multiple number of local memories, wherein the number of the local memories is equal to or greater than the number of the datapath elements and in which each datapath element executes a same instruction, the multiprocessor characterized by that:

each of the multiple datapath elements and the local memories has a first input/output portion and a second input/output portion;

the multiprocessor comprising:
   a data bus connected with all of the first input/output portions of the datapath elements and all of the first input/output portions of the local memories, so that data can be exchanged between one of the multiple datapath elements and another datapath elements through the data bus or between one of the datapath elements and all of the local memories through the data bus in a single operating mode; and
   a plurality of data paths directly connected with second input/output portions of the multiple number of datapath elements and the corresponding second input/output portions of the local memories, respectively, so that the datapath elements can respectively access to the corresponding local memories through the data paths in a parallel operating mode.

5. A multiprocessor comprising a multiple number of datapath elements and a multiple number of local memories, the number of the local memories being equal to or greater than the number of the datapath elements, each datapath element executing a same instruction, the multiprocessor characterized by that;
   each of the multiple datapath elements and the local memories has a first input/output portion and a second input/output portion;
   the multiprocessor comprising:
      a first data bus connected with all of the first input/output portions of the multiple number of datapath elements, so that data can be exchanged between one of the multiple datapath elements and another datapath element through the first data bus;
      a second data bus independent from the first data bus, the second data bus being connected with one of the multiple number of datapath elements and all of the first input/output portions of the local memories, so that data can be exchanged between one of the datapath elements and all of the local memories through the second data bus; and
      a plurality of data paths directly connected with second input/output portions of the multiple number of datapath elements and the corresponding second input/output portions of the local memories, respectively, so that the datapath elements can respectively access to the corresponding local memories via the data paths in a parallel operating mode.

6. A multiprocessor as described in claim 3 or 5, characterized by that when activating all of the multiple datapath elements, there is provided a continuous address space between the corresponding datapath elements, whereas when activating only one of the multiple datapath elements, an interleave arrangement is formed by disposing blocks, in which the same addresses are disposed in turn, continuously from an address 1 to an address M corresponding to an address space of one local memory so that an access can be made from one of the multiple datapath elements to address spaces for all of the local memories.

7. In a multiprocessor which comprises first and second datapath elements, each having at least first and second input/output portions, and a multiple number of memories, wherein the number of memories is equal to or greater than a number of the datapath elements and in which the first and second datapath elements can simultaneously operate in parallel, the multiprocessor characterized by comprising;
   a first data bus which is directly connected with a first input/output portion of the first datapath element and a second input/output portion of the second datapath element and is also directly connected with at least one of the memories;
   a second data bus which is directly connected with a second input/output portion of the first datapath element and a first input/output portion of the second datapath element and is also directly connected with the remaining of the memories; and
   wherein the first and second datapath elements can perform data exchange mutually with any one of the memories through the first and second data buses.

8. A multiprocessor as described in claim 7, characterized by a third data bus which is connected with guard-bit input/output portions of the first and second datapath elements, wherein when exchanging data mutually between the first and second datapath elements, guard-bit data are simultaneously exchanged through the third data bus.

9. In a multiprocessor which comprises a multiple number of datapath elements and a multiple number of local memories, wherein the number of local memories is equal to or greater than the number of the datapath elements and in which each datapath element executes a same instruction, the multiprocessor characterized by comprising:
   control means by which
      as the instruction to control operations of the multiple datapath elements,
      a first conditionally executed instruction for controlling a current execution of operations is supplied to the multiple datapath elements on the basis of flag statuses representing states of previous results of operations respectively held by the multiple datapath elements,
      while a second conditionally executed instruction for controlling the current execution of the operations is produced on the basis of a combination of the flag statuses respectively held by the multiple datapath elements so that the second conditionally executed instruction is supplied to the multiple datapath elements, and
      the multiple data path elements comprise specific control means by which, when being supplied with the first conditionally executed instruction, a condition decision is made as to whether or not the flag status coincides with a condition defined by the first conditionally executed instruction so as to control the current execution of the operations on the basis of a result of the condition decision, while when being supplied with a second conditionally executed instruction, the current execution of the operations is controlled on the basis of the second conditionally executed instruction only.

10. A multiprocessor as described in claim 9, characterized by that each of the first and second conditionally executed instructions comprises
   a condition field for designating the flag status which is used to make the condition decision by the specific control means, and
   an operation field which is formed by an operation code for designating a kind of the operation and an operation operand for designating a kind of a register used for the operation.

* * * * *